United States Patent [19]

Sugiura

[11] Patent Number: 5,144,178
[45] Date of Patent: Sep. 1, 1992

[54] BRUSHLESS GENERATOR WITH MAGNET AND CLAW-TOOTH DUAL ROTOR

[75] Inventor: Tsuneo Sugiura, Iida, Japan

[73] Assignee: Tamagawa Seiki Kabushiki Kaisha, Tokyo, Japan

[21] Appl. No.: 680,339

[22] Filed: Apr. 4, 1991

[51] Int. Cl.⁵ .................. H02K 16/02; H02K 19/30
[52] U.S. Cl. .................. 310/114; 310/68 D; 310/263; 322/46
[58] Field of Search .......... 310/90, 112, 114, 156, 310/68 D, 263, 266; 322/46

[56] References Cited

U.S. PATENT DOCUMENTS 2,689,327  9/1954  Haas ........................ 322/46
4,782,257  11/1988 Secher et al. ............... 310/114

FOREIGN PATENT DOCUMENTS 1304137  4/1987  U.S.S.R. ...................... 310/114

OTHER PUBLICATIONS

Shinko Denki Technical Report No. 114, vol. 32, No. 3, pp. 112 to 117, issued in 1987.

Primary Examiner—Steven L. Stephan
Assistant Examiner—D. L. Rebsch
Attorney, Agent, or Firm—Brooks Haidt Haffner & Delahunty

[57] ABSTRACT

A generator includes a permanent magnet rotor formed in a hollow rotating member rotatably mounted in a casing. A Randell rotor mounted adjacent to the permanent magnet rotor is rotated with the permanent magnet rotor. An armature coil is mounted in association with the permanent magnet rotor and the Randell (claw-tooth) rotor. A first bearing at one end of the casing supports one end of the hollow rotating member. A protruding retainer mounted on the other end of the casing carries a Randell field coil, and a second bearing is mounted on the retainer for supporting a hollow section of the hollow rotating member. The hollow rotating member is supported by the first bearing and a second bearing provided in the hollow section. The generator may be suitably applied to aerospace equipment, unmanned flying objects or to unmanned marine cruising objects.

8 Claims, 6 Drawing Sheets

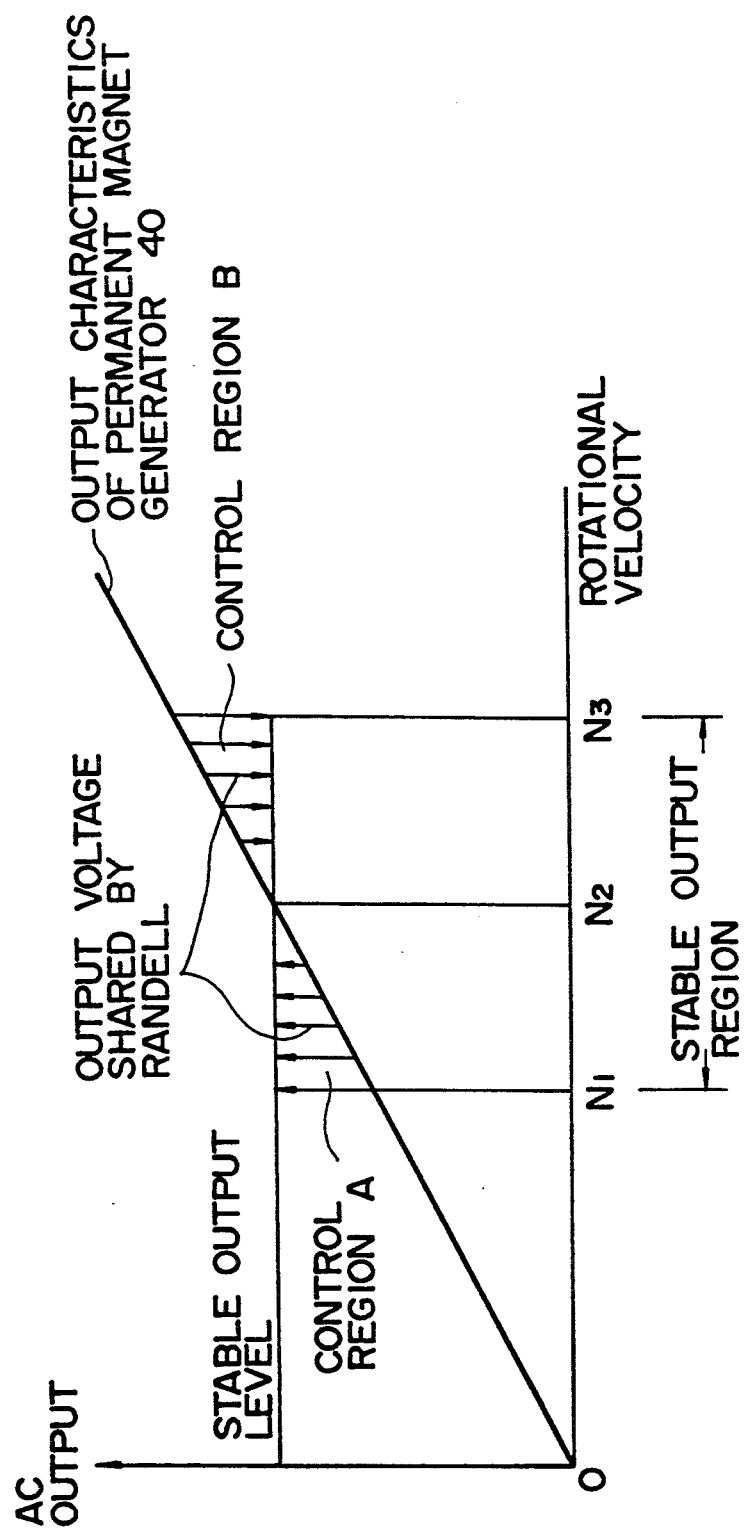

BRUSHLESS GENERATOR WITH MAGNET AND CLAW-TOOTH DUAL ROTOR

BACKGROUND OF THE INVENTION

1. Field of the Invention

This invention relates to a generator and, more particularly, to a generator which is small-sized, lightweight, capable of developing an elevated velocity and suitably applied to aerospace equipment, unmanned flying objects or unmanned marine cruising objects, and in which the output voltage may be quickly adjusted automatically in response to load fluctuations or fluctuations in input speeds.

2. Prior Art

Typical of the arrangements of generators used for the aforementioned applications are on pages 112 to 117 of Shinko Denki Technical Report No. 114, vol, 32, No. −3, issued in 1987.

FIGS. 1 to 5 show the arrangements of a conventional generator.

First, FIG. 1 shows a first prior-art example of a brushless ac generator-rectifying circuit system which is constituted by a power generating section 9, made up of a permanent magnet rotor 1, EX rotary armature 2, rotary rectifier 3, generator main armature 4, permanent magnet armature 5, EX magnetic, field 6, main rotating magnetic field 7 of the generator and rectifier 8, and a voltage regulator 10 connected to the power generating section 9. When the permanent magnet rotor 1 is rotated, a three-phase alternating current is generated in the permanent magnet armature 5.

This three-phase alternating current is converted by a rectifier circuit 11 within the voltage regulator 10 into a direct current for direct current excitation of the EX magnetic field 6. The three-phase ac power is generated in the EX rotary armature 2 in proportion to the magnitude of the dc excitation and converted into the dc power by the rectifier 8 enclosed in the rotor for exciting the main rotating magnetic field 7 of the generator. Three phase ac power is generated in the main generator armature 4 in an amount proportionate to the dc excitation and rectified to produce a dc output.

FIG. 2 shows a second prior-art example of a permanent magnet-thyristor phase control rectifying system, which is constituted by a generator 9, made up of a permanent magnet rotor 1, an armature 5 and a thyristor 12, and a voltage regulator 10, made up of a phase angle control 13, a voltage detection circuit 14 and a filter unit 15. The ac output from the generator is rectified by thyristor 12 by controlling its phase control angle and passed through filter unit 15 to produce the voltage-controlled dc output.

FIGS. 3 to 5 show a third prior-art example of a so called Randell type ac generator-rectifying circuit system, which is constituted by a generator 9, made up of a Randell rotor 1A, a field winding 16, an armature winding 5 and a rectifier 8, and a voltage regulator 10.

The Randell type ac generator is constructed as shown in FIGS. 4 and 5, wherein a rotary shaft 22 is rotatably mounted in a casing 20 by means of a bearing 21, and the Randell rotor 1A is mounted on the rotary shaft 22.

A stator 23 for the armature winding 5 and a fixed field winding 16 provided on a fixed field core 24 are provided in the casing 20. The Randell rotor 1A is a claw-troth rotor made up of a rotor A, a rotor B and a connecting ring 26.

Thus the magnetic fluxes generated by the fixed field winding 16 flow through an air gap, rotor A (N pole side), another air gap, the stator 23, a further air gap, the rotor B(S pole side), the fixed field core 24 and a still further air gap in this order.

On the surface of the Randell rotor 1A, as viewed from the armature side of the stator 23, magnetic poles of the rotating magnetic field are generated, as in the case of the usual synchronous generator.

Voltage control may be achieved easily by controlling the current through the fixed field winding.

The above described prior-art generators suffer from the following disadvantages.

The first type device, while being devoid of brushes, is highly complicated in construction, and is difficult to manufacture.

The second type device is simple in construction as a generator. However, the phase-controlled output waveform is poor as a result of velocity fluctuations and the use of a filter unit is not effective to improve the output voltage characteristics so that it is difficult to realize output compensations against sudden load fluctuations.

The third type device is thought to satisfy the requirements fairly well and hence it is currently in popular use. As a major disadvantage, the field current needs to be obtained by, for example, an initial external power source, while self-starting is not feasible.

The device also suffers from field current losses as compared to the rotating magnet type device, while it is increased in weight.

In addition, the fixed field wiring needs to be controlled extensively against velocity or load fluctuations, while the field controller tends to be bulky.

OBJECTS AND SUMMARY OF THE INVENTION

It is therefore an object of the present invention to provide a generator the output voltage of which may be adjusted promptly and automatically in response to load fluctuations or fluctuations in input velocity.

It is another object of the present invention to provide a generator which is small-sized, lightweight and capable of developing a high operating velocity.

It is a further object of the present invention to provide a generator which may be suitably used in to aerospace equipment, unmanned flying objects or to unmanned marine cruising objects.

The present invention provides a generator comprising a permanent magnet rotor formed on a hollow rotating member rotatably mounted in a casing, a Randell auxiliary rotor mounted adjacent to the permanent magnet rotor and adapted for being rotated with the permanent magnet rotor, an armature coil mounted in association with the permanent magnet rotor and the Randell auxiliary rotor, a first bearing provided at one end of the casing and adapted for rotably supporting one end of the hollow rotating member, a retainer protrudingly mounted on the other end of the casing and carrying a Randell field coil, and a second bearing mounted on the retainer and adapted for supporting a hollow section of the hollow rotating member, said rotating member being rotatably supported by the first bearing and the second bearing provided in the hollow section.

With the generator of the present invention, the voltage outputs generated by permanent magnet rotor and the Randell rotor are combined to synthesize a stable output voltage of the permanent magnet power generating section exhibit higher efficiency and the output of the Randell power generating section exhibit a higher controllability. In this manner, when the apparatus is operating at a lower velocity, the output of the Randell type power generating section is added to the output of the permanent magnet type power generating section for providing a stable output level. On the other hand, when the apparatus is operating at a higher velocity, the output of the Randell type power generating section is decreased for maintaining a stable output level. On sudden load application, the Randell type power generating station is immediately controlled by the series field coil.

The Randell rotor of the Randell type power generating section may be excited by applying an output obtained by the permanent magnet type power generating section to the Randell field coil consisting of a control coil and a series coil.

In addition, since the hollow rotating member provided with the permanent magnet rotor and the Randell rotor is mounted rotatably by a first bearing retaining one end of the hollow rotating member and a second bearing retaining the hollow section of the hollow rotating member, the generator may withstand the higher operating velocity and exhibit high rigidity in sustaining the rotation of the hollow rotating member. Besides, since the bearing is positioned within the hollow section, the axial length of the apparatus may be reduced.

BRIEF DESCRIPTION OF THE DRAWINGS

FIG. 8 is a diagram showing output characteristics of the generator.

PREFERRED EMBODIMENTS OF THE INVENTION

Figure 1:
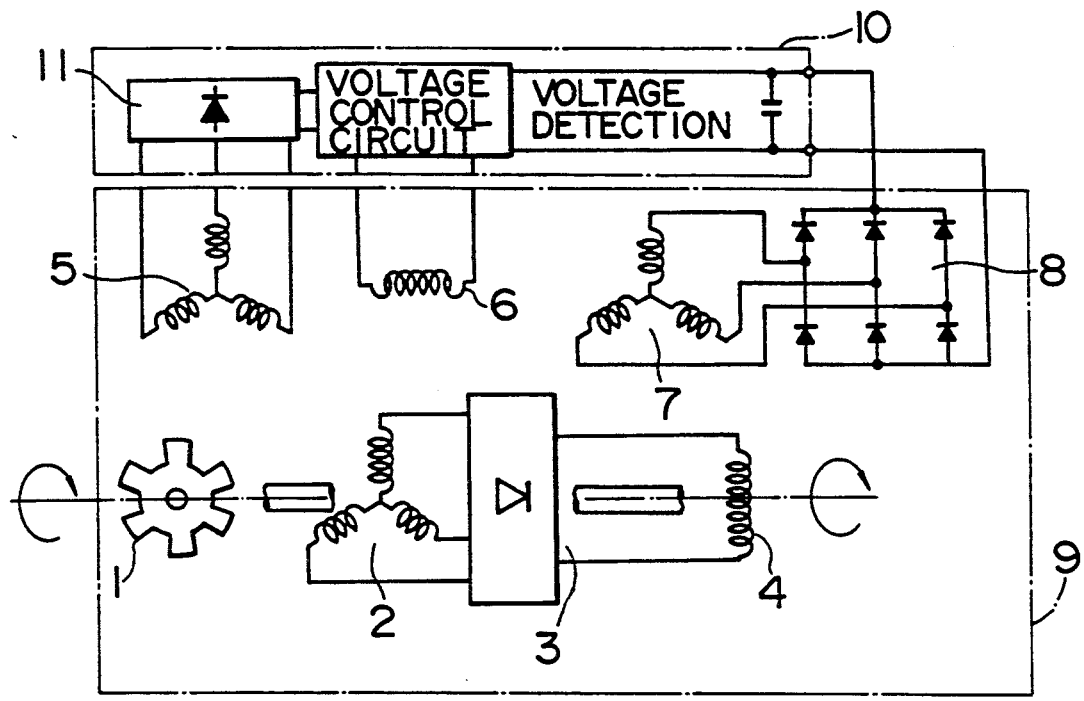
FIGS. 1 to 3 illustrate a control systems of respective power generating systems of prior-art generators.
Figure 2:
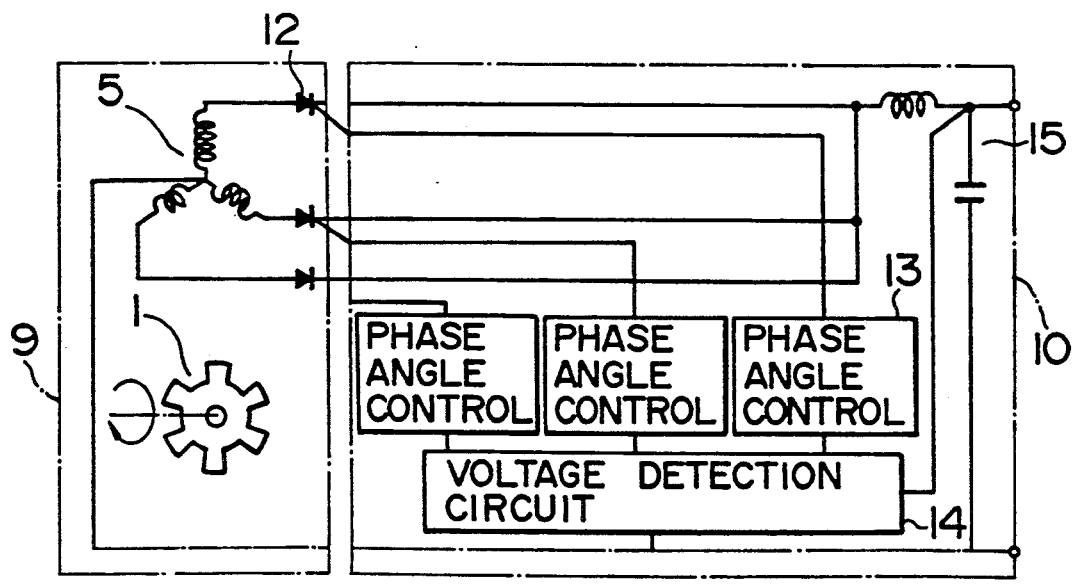
Figure 3:
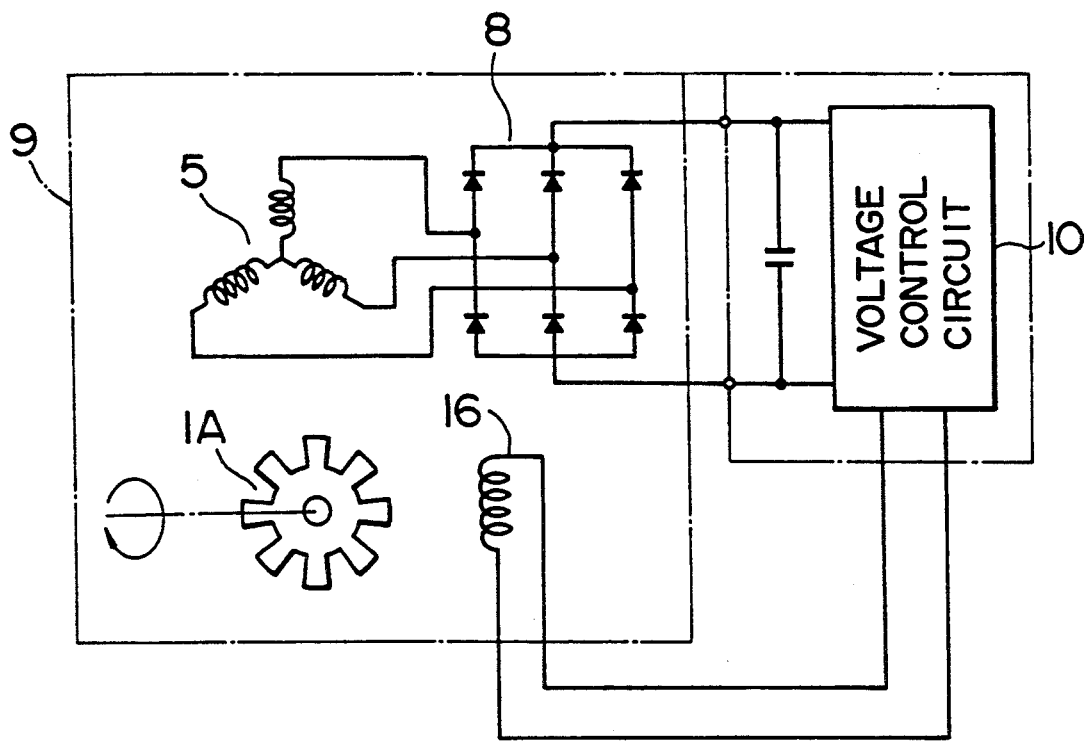
Figure 4:
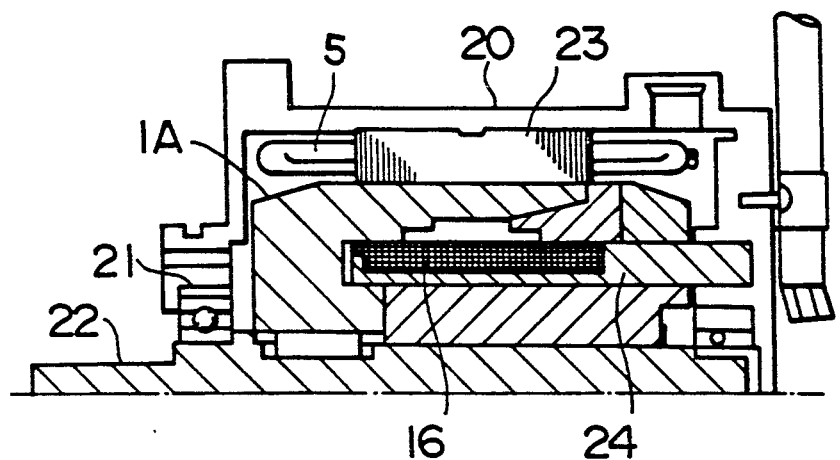
FIG. 4 is a side elevational view, shown partly in section, and showing a prior-art generator.

By referring to the drawings, a preferred embodiment of the generator according to the present invention will be explained in detail.

In the drawings, the parts or components similar to those of the prior-art examples are depicted by the same reference numerals.

Figure 5:
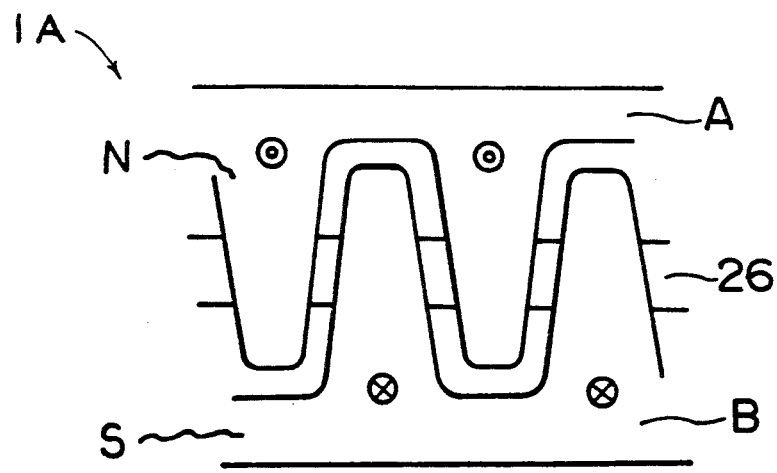
FIG. 5 is an illustrative view of the prior-art generator.
Figure 6:
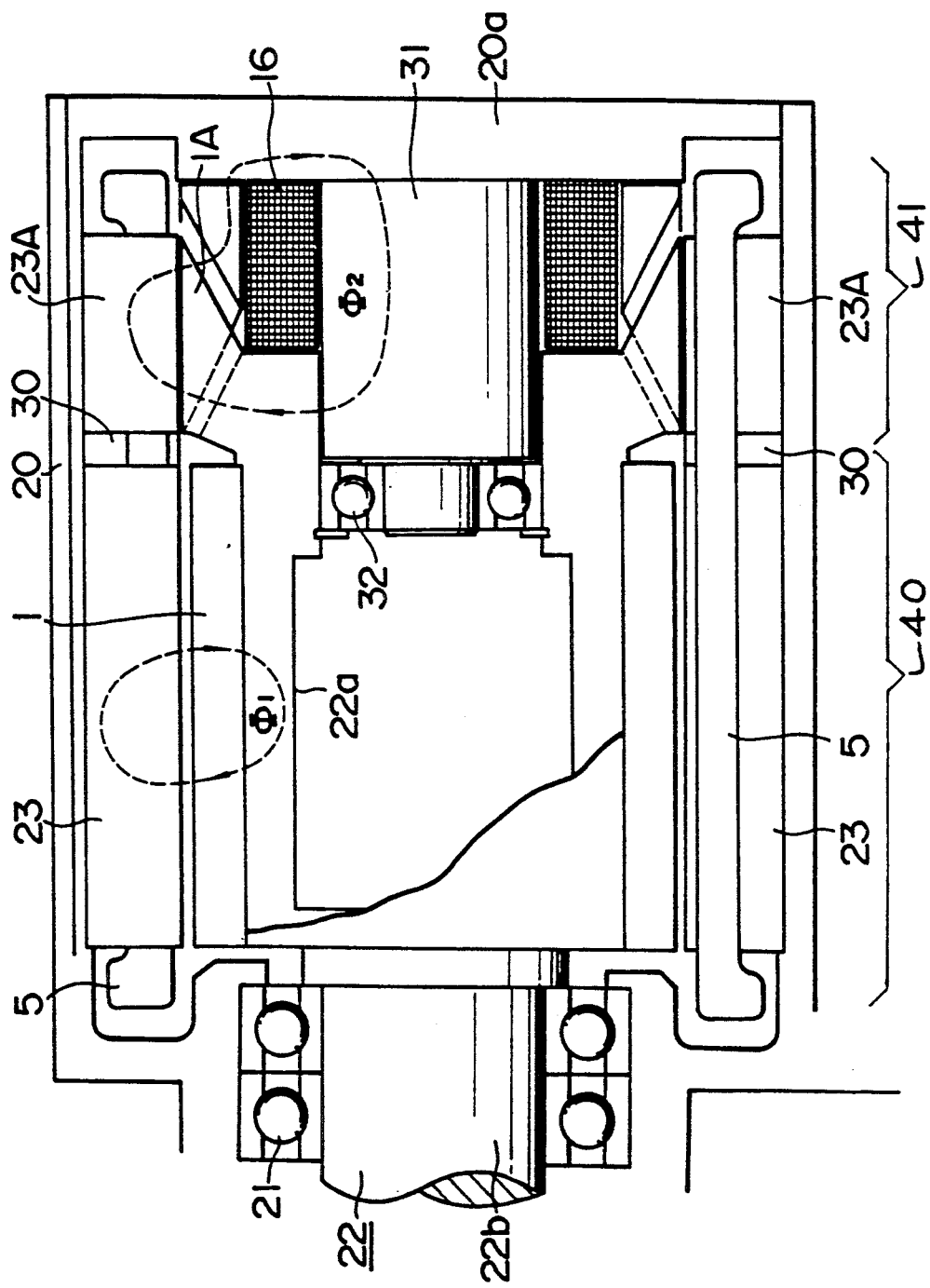
FIG. 6 is a side elevational view, partly shown in section, and showing a generator according to the present invention.
Figure 7:
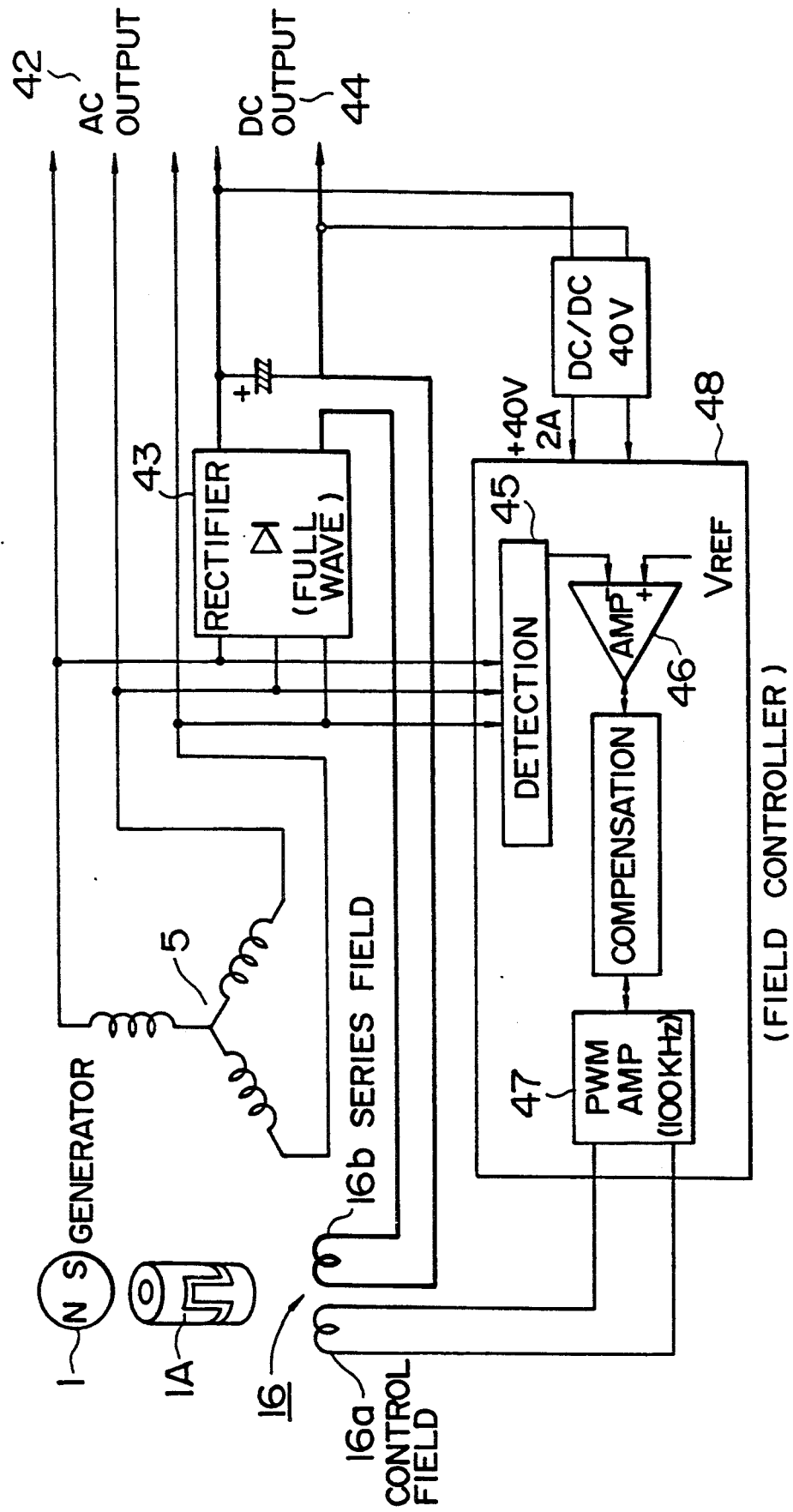
FIG. 7 illustrates a control system for a power generating system.

Referring to FIGS. 6 to 8 showing a generator according to the present invention, and first to FIG. 6, a hollow rotating member 22 is rotatably supported at one end 22b thereof by means of a first bearing 21 within a casing 20. On the hollow rotating member 22, a permanent magnet rotor 1 formed of rare earth elements, and a Randell (claw-tooth) rotor 1A, which is the same as that described in connection with FIG. 5, are provided in tandem along the axis of the rotating member 22.

On the inner wall of the casing 20, a stator 23 for the permanent magnet rotor and a stator 23A for the Randell rotor 1A are separately provided by the interposition of a non-magnetic member 30, such as an air gap, in order to prevent an interference loop from being generated between the stators 23 and 23A. A common one-piece armature winding 5 for the stators 23 and 23A is associated, as an output coil, with the stators 23 and 23A.

A second bearing 32 is carried by the distal end of a retainer 31 provided on a side wall 20a of the casing 20 for protruding axially into the interior of the casing 20. The rotating member 22 is rotatably supported at a mid position of a hollow section 22a thereof by the second bearing 32 for improving the rigidity in the rotational support of the rotating member 22.

A Randell field coil 16 consisting of a control coil 16a and a series coil 16b as shown in FIG. 7 is placed on the outer periphery of the retainer 31.

FIG. 7 shows a control unit for the power generating system. An ac output 42, that is the three-phase ac voltage, produced by the armature winding 5, is taken out directly, while a dc output 44 is taken out by means of a rectifying circuit 43.

Part of the ac output 42 and the dc output 44 are supplied to the control field 16a, as the fixed side, by means of a field controller 48, consisting of a detection circuit 45, a comparator 46 and a waveform modulation/rectifying circuit 47, while part of the dc output 44 is supplied to the series field coil 16b on the load side.

The above described generator of the present invention operates in the following manner.

When the rotating member 22 and thereby the permanent magnet rotor 1 start their rotation, power generation is started by the permanent magnet rotor 1 in the armature winding 5. With increase in the rotational speed of the rotor, the ac output 42 is generated along an output characteristic curve of the permanent magnet power generating section 40 shown in FIG. 6.

The ac output 42 is full-wave rectified by the rectifying circuit 43 so as to be used as a power source (+40V, 2A) for the field controller 48.

The field controller 48 starts its operation when the ac output 42 is supplied thereto. Thus the field controller 48 detects the generated voltage by the detection circuit 45 and, if the detected voltage is lower than the required stable output level, with the rotational speed being not more than $N_2$, a magnetic flux $\phi 2$ is generated by the field coil 16a of the Randell rotor 1A in a direction which adds to magnetic flux $\phi 1$ generated by the permanent magnet rotor 1, thereby providing a stable output level as indicated by a control region A shown in FIG. 8.

When the rotational speed of the rotating member 22 is increased further, such that the output of the permanent magnet power generating section 40 exceeds the stable output level, the control field coil 16a is controlled for generating the magnetic flux $\phi 2$ in a direction subtracts from the magnetic flux $\phi 1$, thereby providing a stable output level shown by a control region B.

Should there occur load fluctuations, a large current flows simultaneously through the series field coil 16b connected in series with the load, thereby directly compensating the load fluctuations at the Randell power generating section 41 without the intermediary of the field controller 48 without any accompanying time lag.

In this manner, owing to the control operations by both the control field coil 16a and the series field coil 16b of the self-starting Randell power generating section 41, a stable output level may be established and maintained promptly against load fluctuations and fluctuations in the rotational velocities.

Although the foregoing description has been made of the embodiment in which the permanent magnet power generating section 40 section 40 and the Randell power generating section 41 are arranged in tandem along the axial direction, the present invention may also be applied to a radial type system or to an axial gap type or a disc type in which the Randell stator 23A and the Randell rotor 1A in the Randell generator 41 are arranged axially, instead of radially, and in opposition to each other.

What is claimed is:

1. A generator comprising a permanent magnet rotor formed on a hollow rotating member rotatably mounted in a casing, a Randell rotor mounted adjacent to said permanent magnet rotor and adapted for being rotated with said permanent magnet rotor, an armature coil mounted in association with said permanent magnet rotor and said Randell rotor, a first bearing provided at one end of said casing and adapted for rotatably supporting one end of said hollow rotating member, a retainer protrudingly mounted on the other end of said casing, a Randell field coil mounted on said retainer, and a second bearing mounted on said retainer and adapted for supporting a hollow section of said hollow rotating member, said hollow rotating member being rotatably supported by said first bearing and said second bearing provided in said hollow section.

2. The generator according to claim 1 wherein said armature coil is common to both said permanent magnet rotor 1A and said Randell rotor 1A.

3. The generator according to claim 1, wherein said Randell field coil is constituted by a control field coil and a series field coil.

4. The generator according to claim 1, wherein a stator core of said armature coil is divided by a non-magnetic material into a stator for said permanent magnet rotor and a stator for said Randell rotor.

5. The generator according to claim 2 wherein said Randell field coil is constituted by a control field coil and a series field coil.

6. The generator according to claim 2, wherein a stator core of said armature coil is divided by a non-magnetic material into a stator for said permanent magnet rotor and a stator for said Randell rotor.

7. The generator according to claim 3, wherein a stator core of said armature coil is divided by a non-magnetic material into a stator for said permanent magnet rotor and a stator for said Randell rotor.

8. The generator according to claim 5, wherein a stator core of said armature coil is divided by a non-magnetic material into a stator for said permanent magnet rotor and a stator for said Randell rotor.

* * * * *

UNITED STATES PATENT AND TRADEMARK OFFICE
CERTIFICATE OF CORRECTION

PATENT NO. : 5,144,178
DATED : September 1, 1992
INVENTOR(S) : T. Sugiura

It is certified that error appears in the above-identified patent and that said Letters Patent is hereby corrected as shown below:

Col. 1, line 27, after "3," "generator main armature" should read --a main generator armature 4, a--; line 28 before "EX" insert --an--; after "magnetic" delete the comma ","; before "main", insert --a--; line 29, before "rectifier" insert --a--; line 42, after "Three" insert hyphen -- - --.

Col. 2, line 1, "claw-troth" should read --claw-tooth--; line 47, after "in" delete "to".

Col. 3, line 2, after "section" insert --to--; line 3, after section insert --to--; line 32, after "illustrate" delete "a".

Col. 4, line 54, before "subtracts" insert --which--.

Col. 5, line 3, delete first occurrence "section 40".

Col. 6, line 5, delete both occurrences "1A".

Signed and Sealed this

Ninth Day of November, 1993

Attest:

BRUCE LEHMAN

*Attesting Officer*  *Commissioner of Patents and Trademarks*